(12) United States Patent
Demick

(10) Patent No.: US 7,708,294 B2
(45) Date of Patent: May 4, 2010

(54) DETACHABLE DUAL-USE PLATFORM APPARATUS AND METHOD

(75) Inventor: Robert L. Demick, Macomb Township, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 294 days.

(21) Appl. No.: 11/769,008

(22) Filed: Jun. 27, 2007

(65) Prior Publication Data

US 2008/0106058 A1    May 8, 2008

Related U.S. Application Data

(60) Provisional application No. 60/863,988, filed on Nov. 2, 2006.

(51) Int. Cl.
*B60R 3/00* (2006.01)
(52) U.S. Cl. .................... 280/164.1; 280/163
(58) Field of Classification Search ........... 280/163, 280/164.1, 166, 169; 414/537
See application file for complete search history.

(56) References Cited

U.S. PATENT DOCUMENTS

| | | | | |
|---|---|---|---|---|
| 1,310,973 | A | | 7/1919 | Von Schrenk |
| 3,510,015 | A | * | 5/1970 | Roshaven ................ 414/537 |
| 3,989,148 | A | * | 11/1976 | Donohue ................ 414/537 |
| 4,003,483 | A | * | 1/1977 | Fulton ................ 414/537 |
| 5,494,393 | A | * | 2/1996 | Schrunk ................ 414/537 |
| 5,540,474 | A | * | 7/1996 | Holland ................ 296/61 |
| 5,685,594 | A | * | 11/1997 | Harper ................ 296/51 |
| 6,158,798 | A | * | 12/2000 | Stedtfeld et al. ............ 296/61 |
| 6,185,775 | B1 | * | 2/2001 | McCarthy ................ 14/69.5 |
| 6,267,398 | B1 | | 7/2001 | Lombard |
| 6,520,523 | B2 | | 2/2003 | Beck |
| 6,575,516 | B2 | * | 6/2003 | Webber ................ 296/61 |
| 6,592,135 | B2 | | 7/2003 | Hendrix |
| 6,887,028 | B1 | * | 5/2005 | Kirla, Jr. ................ 414/537 |
| 7,083,179 | B2 | * | 8/2006 | Chapman et al. ............ 280/163 |
| 7,179,042 | B1 | * | 2/2007 | Hartmann et al. ............ 414/537 |
| 7,344,184 | B2 | * | 3/2008 | Salvador et al. ............ 296/183.1 |
| 7,350,843 | B2 | * | 4/2008 | Meyers et al. ............ 296/50 |
| 2002/0163157 | A1 | * | 11/2002 | Beck ................ 280/164.1 |
| 2002/0195792 | A1 | * | 12/2002 | Hendrix ................ 280/164.1 |
| 2003/0168874 | A1 | | 9/2003 | Bautista, Jr. |
| 2003/0213072 | A1 | * | 11/2003 | Myrick et al. ............ 14/69.5 |
| 2004/0256832 | A1 | * | 12/2004 | Bradsen et al. ............ 280/163 |
| 2005/0281654 | A1 | * | 12/2005 | Ehler ................ 414/537 |
| 2007/0246965 | A1 | * | 10/2007 | Adair ................ 296/61 |

* cited by examiner

*Primary Examiner*—Lesley Morris
*Assistant Examiner*—Vaughn T Coolman

(57) ABSTRACT

A vehicle is provided having a cargo area, a passenger compartment, and a detachable dual-use platform which is connectable to the cargo area to form a ramp, and to the underside of the vehicle to form a running board. The platform is supported by brackets at either end when used as a running board, and includes an internal locking mechanism. A platform apparatus is also provided for accessing the vehicle, including a first locator portion that is adjacent to the cargo area, and a dual-use platform portion having a step surface on one side and a second locator portion on an opposite side. The locator portions are mutually engageable to secure the platform to the cargo area. A method is also provided for accessing the vehicle, including configuring a platform for alternate attachment adjacently to the passenger compartment as a running board and adjacently to the cargo area as a ramp.

4 Claims, 5 Drawing Sheets

DETACHABLE DUAL-USE PLATFORM APPARATUS AND METHOD

CROSS-REFERENCE TO RELATED APPLICATIONS

This application claims the benefit of U.S. Provisional Patent Application No. 60/863,988, filed Nov. 2, 2006, and entitled "DETACHABLE DUAL-USE RUNNING BOARD", which is hereby incorporated by reference in its entirety.

TECHNICAL FIELD

The present invention relates to a vehicle access platform configured for alternate use as a side running board for accessing a vehicle passenger compartment and as a ramp for accessing a cargo area of the vehicle.

BACKGROUND OF THE INVENTION

Modern vehicles such as pickup trucks and sport utility vehicles (SUVs) provide greater utility for some purposes in relation to smaller passenger cars, due in large part to their substantial size and weight. These advantages expand the range of cargo that may be towed by or transported within the vehicle. For example, pickup trucks and SUVs are typically designed to carry relatively heavy machinery, construction materials, and/or recreational vehicles such as three-wheel or four-wheel all-terrain vehicles (ATVs), motorcycles, and snowmobiles. To accommodate the loading and unloading of such items, as well as to assist vehicle occupants in entering and exiting the elevated passenger compartment or cabin portion of the vehicle, pickup trucks and SUVs often utilize one or more entry-assist mechanisms.

To assist in entering and exiting of the passenger compartment or cabin, pickup trucks and SUVs may be outfitted with side platforms or "running boards" that extend lengthwise beneath and alongside the passenger compartment of the vehicle at a position adjacent to the passenger doors in order to provide a convenient step surface. Running boards are popular accessories that are often constructed from or incorporate various aesthetically pleasing materials, such as stainless steel, chrome, brushed metal, and/or injection-molded plastics, in order to enhance the overall look and cosmetic appeal of the vehicle. Alternately, tubular steps, extensions, or "nerf bars" may be used in place of running boards for the same functional access purpose, but offering a different aesthetic look and appeal.

Likewise, the loading and unloading of a truck bed or cargo area is greatly simplified by using a ramp to reach the elevated level of the truck bed or cargo area above the road surface. Such ramp devices may be transportable within an open or enclosed cargo area, and then securely clamped or bolted to the vehicle when needed. However, such devices may be less than optimal for certain purposes. For example, transportable ramp devices are not intended to accommodate access to the passenger compartment, requiring a separate device.

SUMMARY OF THE INVENTION

Accordingly, a vehicle is provided having a cargo area, a passenger compartment, a detachable dual-use platform, and a ramp adapter that is operatively attached to or formed integrally with the vehicle adjacently the cargo area.

In one aspect of the invention, the platform is alternately connectable adjacently to the cargo area to form a ramp for accessing the cargo area, and to the underside of the vehicle adjacently to the passenger compartment to form a running board for accessing the passenger compartment, with the ramp adapter being operable for engaging and securing the dual-use platform at a position that is adjacent to the vehicle.

In another aspect of the invention, the platform has a through-opening formed through one end that is configured as a hand hold for carrying or transporting the platform, and the ramp adapter has a plurality of hooking mechanisms configured to engage the through-opening to thereby secure the platform to the vehicle when the platform is used as a ramp.

In another aspect of the invention, the ramp adapter includes at least one groove positioned adjacently to the cargo area, and the platform has a dual-use locator bar operatively attached to its underside, with the locator bar being configured to serve alternately as a hand hold suitable for carrying or transporting the platform and as a locator mechanism that is insertable into the groove for securely attaching the platform to the vehicle to function as a ramp.

In another aspect of the invention, the platform is supported at each end by a different one of the pair of spaced mounting brackets when the platform is used as a running board.

In another aspect of the invention, the platform has a recess formed in one end, and one of the spaced mounting brackets includes a locking mechanism having a moveable latch, with the moveable latch being insertable into the recess when a key is moved to thereby securely lock the platform between the pair of brackets.

In another aspect of the invention, a platform apparatus for accessing a vehicle having a cargo area and a passenger compartment is provided. The apparatus has a first locator portion positioned adjacently to the cargo area, and a detachable dual-use platform portion having a slip-resistant step surface on one side and a second locator portion that is engagable with the first locator portion and operatively attached to the opposite side. The platform is configured for alternate use as a running board for accessing the passenger compartment when attached adjacently thereto, and as a ramp for accessing the cargo area when the first and second locator portions are engaged.

In another aspect of the invention, the first locator portion is a groove formed in a portion of a bumper, and the second locator portion is a bar that is insertable into the groove.

In another aspect of the invention, a method of accessing a vehicle having a passenger compartment and a separate cargo area is provided. The method includes configuring at least one of a pair of spaced mounting brackets with an internal locking mechanism having a moveable latch, and configuring a detachable platform with a first locator mechanism and an internal recess for receiving the latch.

In another aspect of the invention, the method includes moving the latch in one direction to lock the platform at a first position between the pair of spaced mounting brackets for use as a running board, moving the latch in another direction to unlock the detachable platform from the pair of spaced mounting brackets, and attaching the platform to a second position adjacent to the cargo area for use as a ramp in accessing the cargo area.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
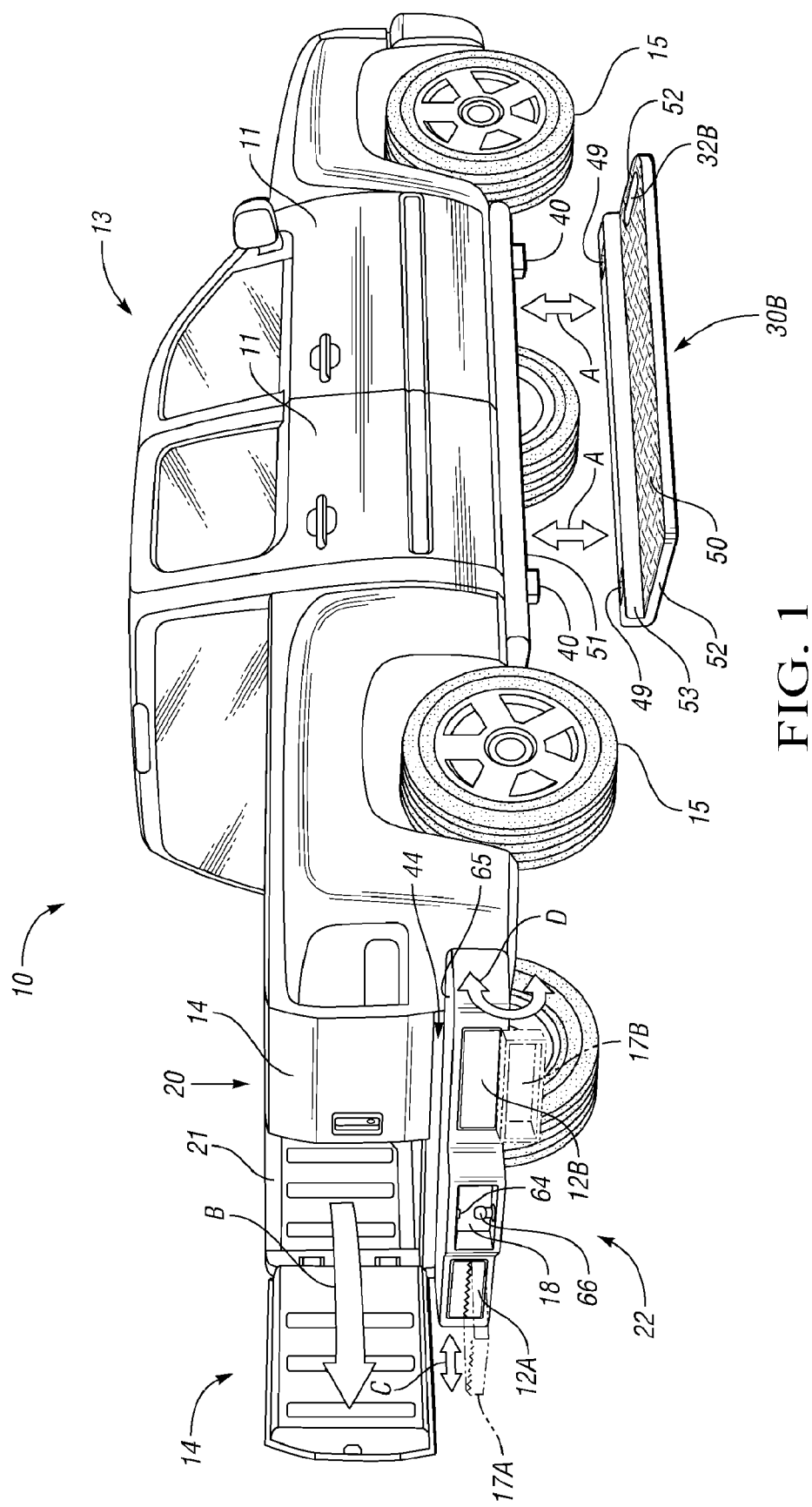
FIG. 1 is a schematic perspective illustration of a vehicle having a pair of detachable dual-use vehicle access platforms according to the invention.

Referring to the drawings wherein like reference numbers correspond to like or similar components throughout the several figures, there is shown in FIG. 1 a vehicle 10, represented as a pickup truck, but which may also take the form of a sport utility vehicle (SUV) or other similarly styled large vehicle. Vehicle 10 has a plurality of wheels 15 and a passenger compartment 13 having passenger doors 11 suitable for accessing passenger compartment 13. An elevated truck bed or cargo area 20 extends rearward from passenger compartment 13 to a vehicle bumper 22, and is suitably configured and/or constructed to carry or transport a predetermined load in accordance with the particular design and intended purpose of vehicle 10.

Cargo area 20 is operatively attached to one or more tailgate doors 14. The tailgate doors 14 are preferably arranged in a 50/50-style split tailgate door, i.e. each door being substantially equal in size as shown in FIG. 1, and configured to swing outwardly (arrow B) to thereby allow access to cargo area 20 from the rear of the vehicle 10. However, within the scope of the invention tailgate doors 14 may also be a single tailgate door, whether outwardly or upwardly hinged or pivotable, a 60/40-style split tailgate door arrangement, or other closure device such as a cargo net or gate suitable for closing cargo area 20 of the vehicle 10 as needed and appropriate.

Bumper 22 is preferably configured to provide low-speed collision protection similar to that of bumpers of the type known in the art, and is securely bolted or otherwise rigidly attached to cargo area 20 having inner walls 21. A ridge or lip 44 is attached to or formed integrally with cargo area 20 and positioned adjacent to an upper surface 65 of bumper 22, to form a barrier therebetween, with lip 44 preferably comprising an approximately 1 to 2 inch level height difference between cargo area 20 and bumper 22 and marking the inward limit or threshold of closure for tailgate doors 14.

Bumper 22 may also include a pair of optional step compartments 12A and 12B flanking a center compartment 18. Center compartment 18 may include a bumper hitch 66 and/or a license plate (not shown). Step compartments 12A and 12B each preferably conceal or contain a platform or step 17A and 17B, respectively, which are alternately deployable and stowable to provide a convenient step or platform suitable for assisting in loading/unloading and/or accessing of cargo area 20. For example, as shown in phantom, a simple spring loaded or push-to-extend step or platform 17A may be manually deployed to extend rearward from bumper 22 (arrow C) and securely lock into place. Alternately, step 17B may be manually or automatically deployed to rotate or hinge upward and downward with respect to bumper 22, as indicated by arrow D, to provide a convenient step height. Preferably, step 17B is deployed by actuating an electric motor (not shown) via a weather-protected switch 64 that is mounted within or in close proximity to bumper 22, preferably within center compartment 18 and/or within the passenger compartment 13.

A pair of substantially identical and detachable, dual-use platforms 30A (see FIG. 2) and 30B are positioned beneath and adjacent to passenger doors 11, and are operatively attached to and removable from vehicle 10 at or along underside 51 of passenger compartment 13, as represented by arrows A. Each platform 30A, 30B is configured for alternate use as running boards for accessing passenger compartment 13 when connected adjacent to passenger area 13 at or along underside 51, and as a ramp for accessing cargo area 20 when connected adjacent to cargo area 20, as will be described later hereinbelow. Each of platforms 30A and 30B preferably has a respective handhold or through-opening 32A (see FIG. 2) and 32B formed through the platform 30A, 30B near one end 52, with the through-openings 32A, 32B configured to facilitate lifting, removing, and carrying or transporting of platforms 30A, 30B to cargo area 20 of vehicle 10 once detached from underside 51, as well as providing a convenient opening for securely attaching platforms 30A and 30B to cargo area 20 as described hereinbelow.

Platforms 30A and 30B each preferably include a textured, slip-resistant main surface 50A and a pair of attachment wells or mounting holes 49 operatively attachable to a mating pair of posts or mounting brackets 40. Mounting brackets 40 are bolted, welded, or otherwise securely attached to vehicle 10 at or along underside 51 of passenger compartment 13, and are configured to engage with mounting holes 49 to thereby secure platforms 30A, 30B with respect to underside 51. As will be understood by those of ordinary skill in the art, mounting brackets and holes 40, 49, respectively, may be attached to the opposite member, i.e. with mounting brackets 40 being formed with or operatively attached to platforms 30A, 30B rather than to underside 51, and holes 49 formed in vehicle 10.

Figure 2:
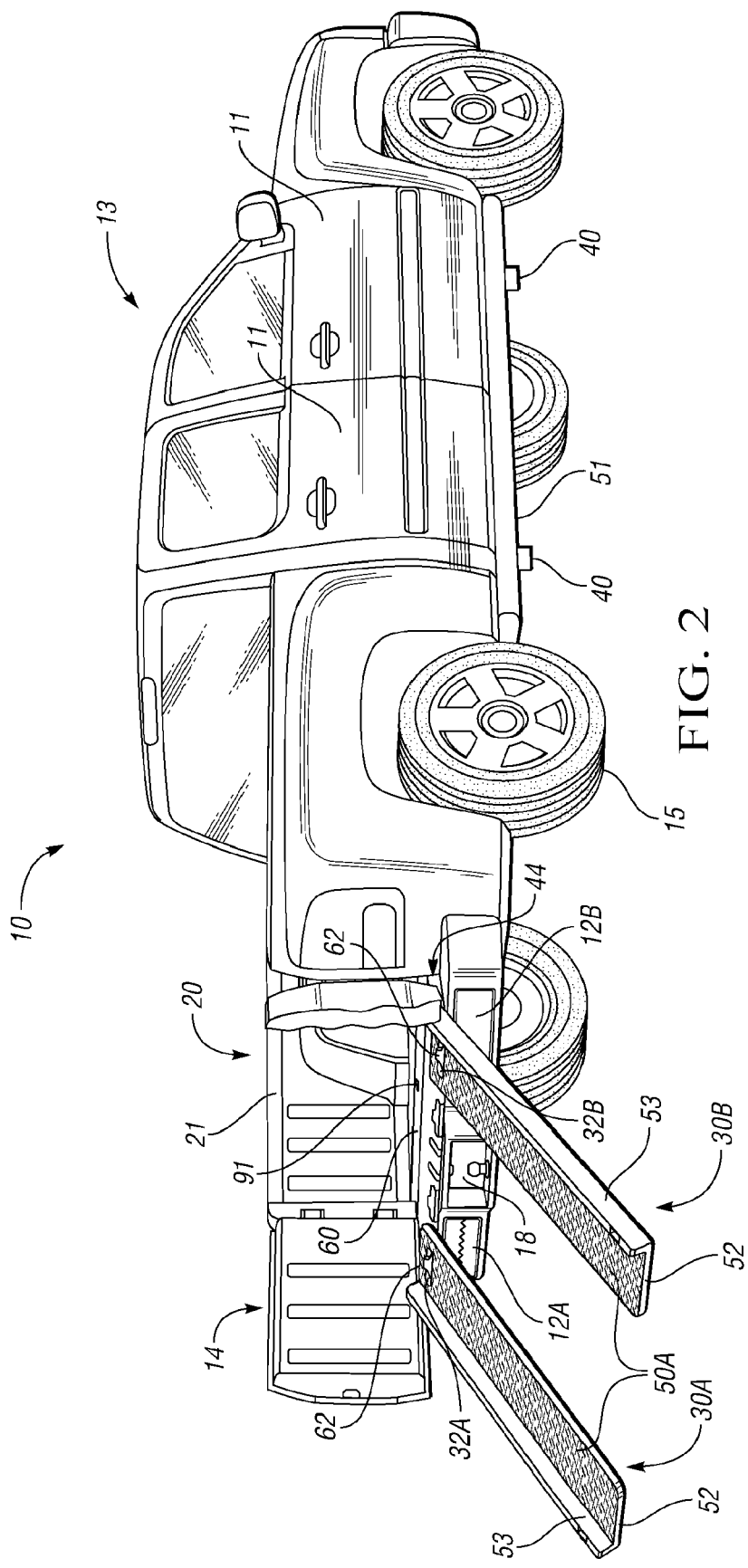
FIG. 2 is a schematic perspective illustration of a pair of detachable dual-use vehicle platforms attached to the cargo area of a vehicle.

Turning to FIG. 2, once removed from underside 51 of vehicle 10, platforms 30A and 30B are operatively attachable to vehicle 10 at a position adjacent to cargo area 20 to function as loading ramps suitable for the loading and unloading of cargo and other items to and from cargo area 20. Each platform 30A, 30B is preferably positioned with one end 52 positioned adjacently to cargo area 20, such as via a ramp adapter 60 having a plurality of hooking mechanisms 62 as shown in more detail in FIG. 4 and discussed later hereinbelow. An outer wall portion 53 of each platform 30A, 30B is positioned radially outward with respect to main surface 50A to form a barrier. Ramp adapter 60 may be either separate from cargo area 20 and installed over a rear latch 91 as shown in FIG. 2, or molded and/or integrally formed with cargo area 20, attached to tailgate door 14, and/or to bumper 22. When ramp adapter 60 is used with or attached to a drop-style tailgate door (not shown), for example, a variable ramp angle may be provided that may not be available with a single fixed attachment point. The other end 52 of each of platforms 30A and 30B rests firmly on the ground such that platforms 30A and 30B are securely braced against and supported by the ground at one end 52 and by cargo area 20 and/or bumper 20 at the other end 52.

Platforms 30A, 30B are preferably constructed from a lightweight material that is corrosion and slip resistant, and/or a composite material, and/or stainless or alloyed metals, and each have sufficient compressive and tensile strength for supporting a predetermined load. Also, platforms 30A, 30B are preferably designed, trimmed, shaped, and/or finished to provide an aesthetically-pleasing appearance that is complementary to the overall intended design of vehicle 10, thus having an appearance that is desirable and appropriate for the majority of the time that platforms 30A, 30B are expected to be attached alongside vehicle 10 and operating or functioning as running boards.

Figure 3:
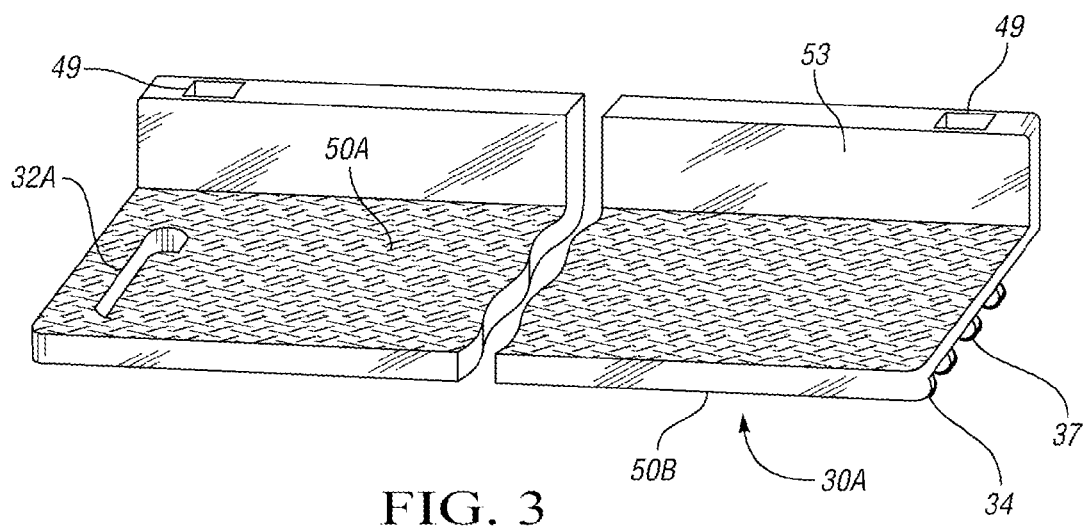
FIG. 3 is a perspective partially cut away view of a detachable dual-use platform according to the invention.

Turning to FIG. 3, a cut away perspective view of platform 30A, which is substantially identical to platform 30B (see FIGS. 1 and 2) as noted hereinabove, is shown in greater detail, with a through-opening 32A formed as a through-hole in proximity to one end 52, and having a pair mounting holes 49 formed in an outer wall 53, as previously described hereinabove. Platform 30A preferably has a lip 34, and may include an optional plurality of wheels, bearings, or rollers 37 mounted to bottom surface 50B of step 30A, i.e. the side opposite main surface 50A, with lip 34 being adapted to facilitate locating and/or securing platform 30A with respect to one or more grooves 70 formed in ramp adapter 60 (see FIG. 4). Rollers 37 are thus configured to facilitate movement of platform 30A by rolling platform 30A along the ground once platform 30A is removed from vehicle 10, thereby assisting in the repositioning of platform 30A from a running board alongside passenger compartment 13 to a loading ramp behind cargo area 20 (see FIGS. 1 and 2).

Figure 4:
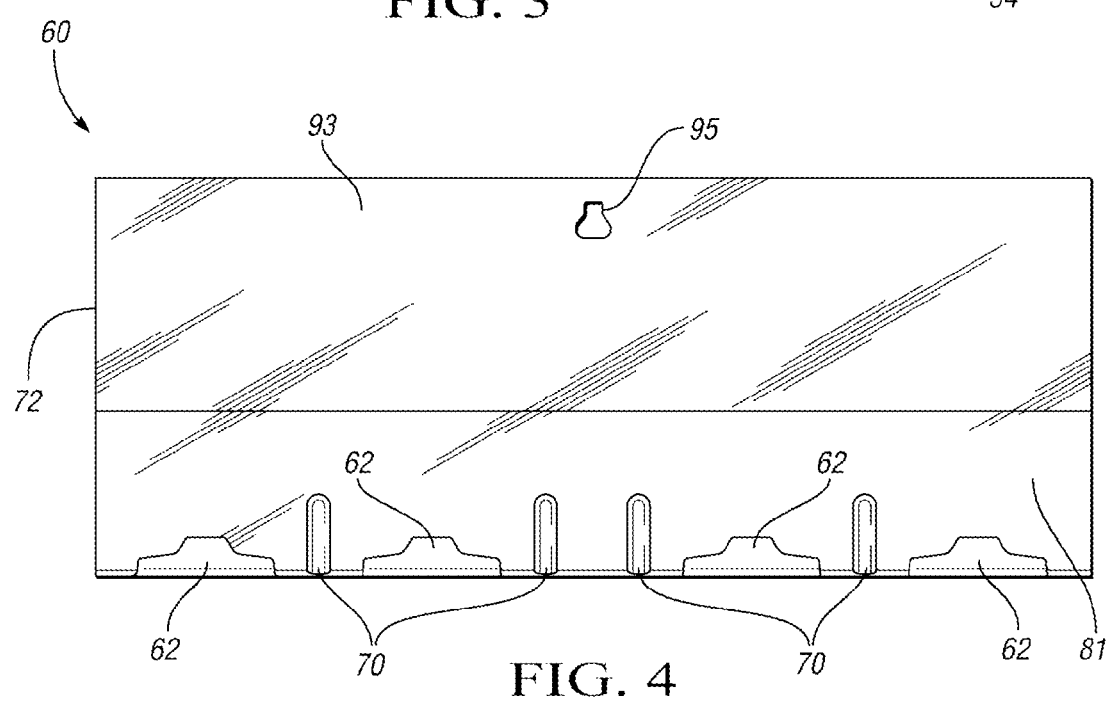
FIG. 4 is a plan view illustration of a ramp adapter for use with a detachable dual-use platform according to the invention.

Turning to FIG. 4, ramp adapter 60 is shown, and which is operable for engaging and securing dual-use platform 30A and/or 30B with respect to cargo area 20. Ramp adapter 60 is configured with an upper portion 93 having an opening or latch hole 95, an angled lower portion 81 having a plurality of hooking mechanisms 62 and grooves 70, and a side portion 72. Latch hole 95 is configured to position and engage the ramp adapter 60 with respect to cargo area 20 by allowing ramp adapter 60 to be slipped or placed over rear latch 91 (see FIG. 2), with ramp adapter 60 preferably spanning the width of cargo area 20 so that ramp adapter 60 is laterally braced by inner walls 21 of cargo area 20, thereby preventing ramp adapter 60 from rotating or turning with respect to rear latch 91. Ramp adapter 60 may be integrally formed with vehicle 10 at a position that is adjacent to cargo area 20.

Figure 5:
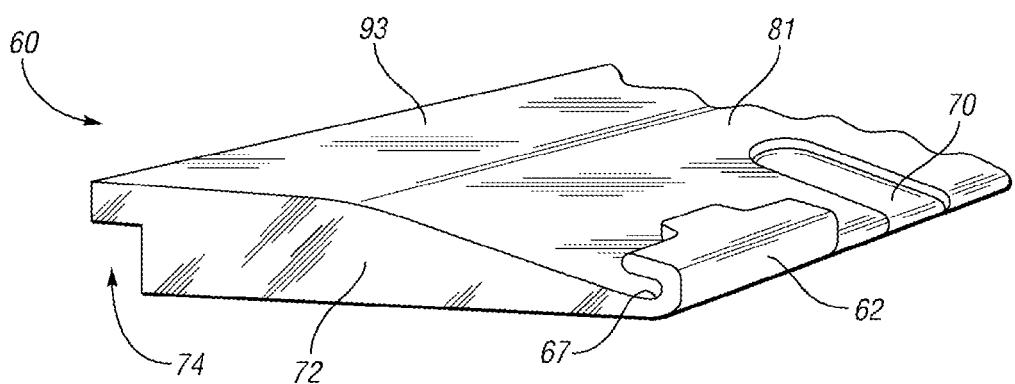
FIG. 5 is a perspective side view illustration of the ramp adapter of FIG. 4.

Turning to FIG. 5, ramp adapter 60 is shown from the perspective of side 72, with side 72 having a cutout or notch 74. When attached to cargo area 20, lip 44 (see FIG. 1) rests firmly within notch 74 to further prevent forward movement of ramp adapter 60, i.e. in a direction toward passenger compartment 13. Recess 67 of hooking mechanism 62 is also shown in FIG. 4. When hooking mechanism 62 is inserted into a corresponding through-opening 32A, 32B of platform 30A, 30B (see FIGS. 2 and 3) and platform 30A, 30B is pulled or drawn rearward or away from vehicle 10 (see FIGS. 1 and 2), platform 30A, 30B engages with recess 67 of hooking mechanism 62 at through-opening 32A, 32B, thereby holding or securing platform 30A, 30B to cargo area 20 (see FIG. 2).

Platform 30A, 30B is also additionally secured with respect to ramp adapter 60 via the mating engagement of lip 34 (see FIG. 3) within groove 70.

Turning back to FIG. 4, ramp adapter 60 is preferably configured with four hooking mechanisms 62 and four grooves 70 in order to provide a variety of ramp widths when both of platforms 30A, 30B are attached to cargo area 20. For example, if platforms 30A and 30B are connected at their most distant position with respect to each other, i.e. the two outer-most hooking mechanisms 62 and grooves 70, so that two hooking mechanisms 62 and two grooves 70 are positioned therebetween, this platform arrangement will form a ramp for facilitating the loading and unloading of relatively wide cargo such as ATVs or other recreational vehicles. Likewise, if platforms 30A, 30B are attached with just one hooking mechanism 62 and one groove 70 positioned therebetween, a relatively narrow cargo ramp is thereby formed. Also, a single platform 30A or 30B could be attached at any one of the available hooking mechanism 62 in order to provide a single ramp suitable for loading smaller cargo, for example, a single wheel or multiple in-line wheels, such as a wheelbarrow, motorcycle, or bicycle. Preferably, the relative positions of hooking mechanisms 62 provide attachment options for approximately 10", 20", and 30" center-to-center configurations with respect to the platforms 30A, 30B, although other configurations are useable within the scope of the invention.

Figure 6A:
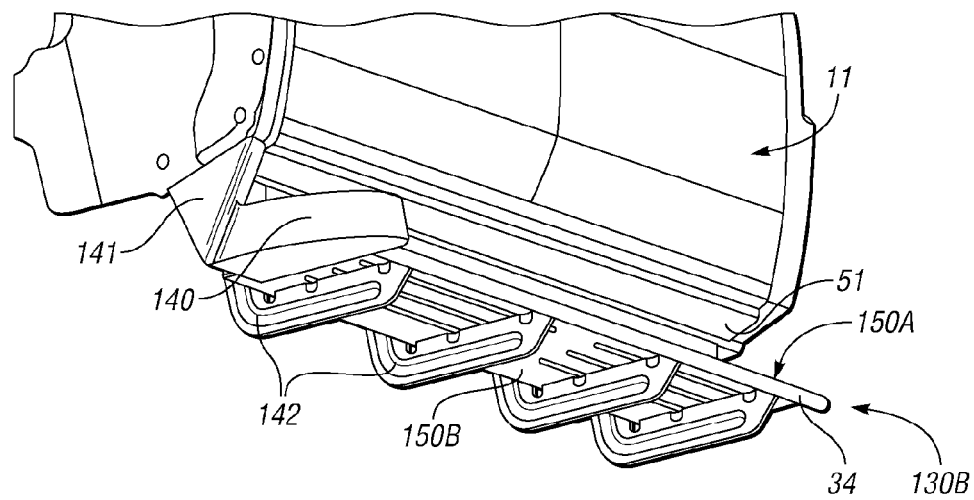
FIG. 6A is a perspective bottom view illustration of a second embodiment of a detachable dual-use platform.

Turning to FIG. 6A, a second embodiment is shown as platform 130B positioned adjacent to and beneath passenger doors 11, and operatively attached to underside 51 of passenger compartment 13. Although not shown in FIG. 6A, a substantially identical platform 130A (see FIG. 7) is operatively attached on the opposite or driver side of passenger compartment 13. Platform 130B has a main surface 150A formed on or attached to one side, i.e. the exposed side, and a bottom surface 150B formed on or attached to the opposite or reverse side, i.e. the ground-facing side. Platform 130B is supported at each end 152 (see FIG. 6B) by a different mounting bracket 140 (see FIG. 6B), and from bottom surface 150B by a plurality of preferably L-shaped support members or brackets 142.

Main surface 150A and bottom surface 150B preferably meet at a lip 34 formed along the axial length of platform 130B, with each of support brackets 142 positioned adjacent to bottom surface 150B and against lip 34 to thereby support platform 130B. Mounting bracket 140 is rigidly and/or securely attached or fastened to underside 51 using a molded mounting portion 141, such as a triangular or wedge shaped metal, plastic, or composite extension piece or bracket sufficiently formed or constructed to position platform 130B with respect to underside 51 and passenger doors 11, as desired and consistent with the particular design parameters of vehicle 10.

Figure 6B:
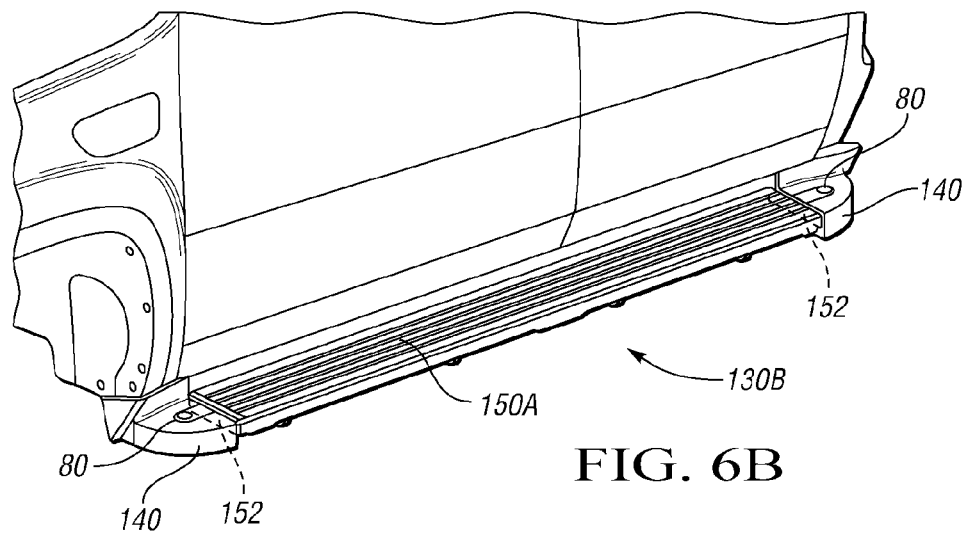
FIG. 6B is a perspective top view illustration of the detachable dual-use vehicle platform of FIG. 6A.

Turning to FIG. 6B, platform 130B is shown from a top perspective, with upper step surface 150A extending coextensively with passenger doors 11 to provide a conveniently located running board. Platform 130B is supported at each end 152 by a different mounting bracket 140, and secured or locked in place by a preferably internal locking mechanism 80. In this manner, platform 130B, while operating in its capacity as a running board, is secured and supported by the combination of mounting brackets 140 using locking mechanisms 80, and from underneath by support brackets 142, as previously described hereinabove with reference to FIG. 6A.

Figure 6C:
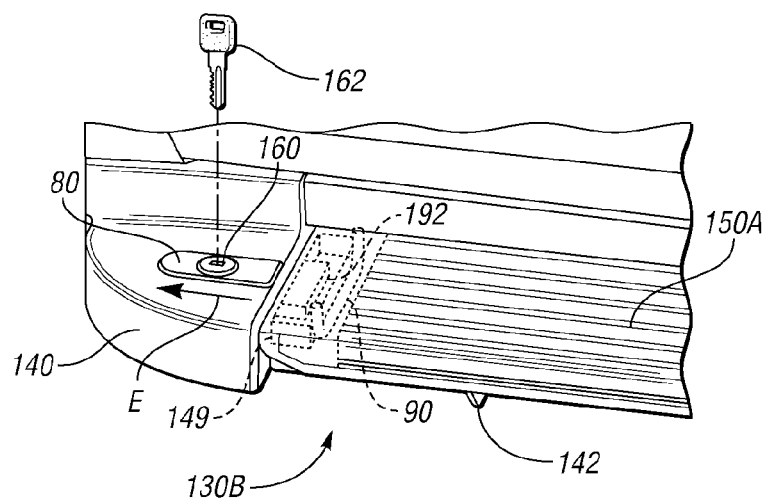
FIG. 6C is a perspective cut away top view illustration of the detachable dual-use vehicle platform of FIGS. 6A and 6B.

Turning to FIG. 6C, mounting bracket 140 is shown in greater detail having a locking mechanism 80 formed or positioned therein. Locking mechanism 80 is preferably a moveable, key-actuated latching device that is alternately locked and unlocked using a key 162, such as an ignition key configured for starting vehicle 10 (see FIGS. 1 and 2). Key 162 is inserted into key opening 160 in locking mechanism 80 and rotated, moved, or turned in one direction therein to actuate or move a moveable latch piece 192. Latch piece 192 in turn alternately enters into and retracts or recedes from a recess or mounting hole 149 formed in an end 152 of platform 130B adjacent to latch piece 192, thus respectively securing or locking platform 130B between mounting brackets 140 to thereby function as a running board, and releasing platform 130B from between mounting brackets 140 to function as a loading ramp, as will now be described in greater detail.

Still looking at FIG. 6C, a preferred dual-use handle/locator bar 90, or other suitable locating mechanism, is operatively attached to bottom surface 150B of platform 130B as shown. Handle/locator bar 90 is preferably circular in cross-section, and is rigidly and securely attached to bottom surface 150B and sufficiently formed to provide a convenient handle or hand hold for carrying or transporting platform 130B once released from mounting brackets 140 (see FIG. 6B). Handle/locator bar 90 is preferably constructed of corrosion resistant materials such as stainless steel to protect handle/locator bar 90 from corrosion, particularly due to its exposed position in proximity to the road surface.

Figure 7:
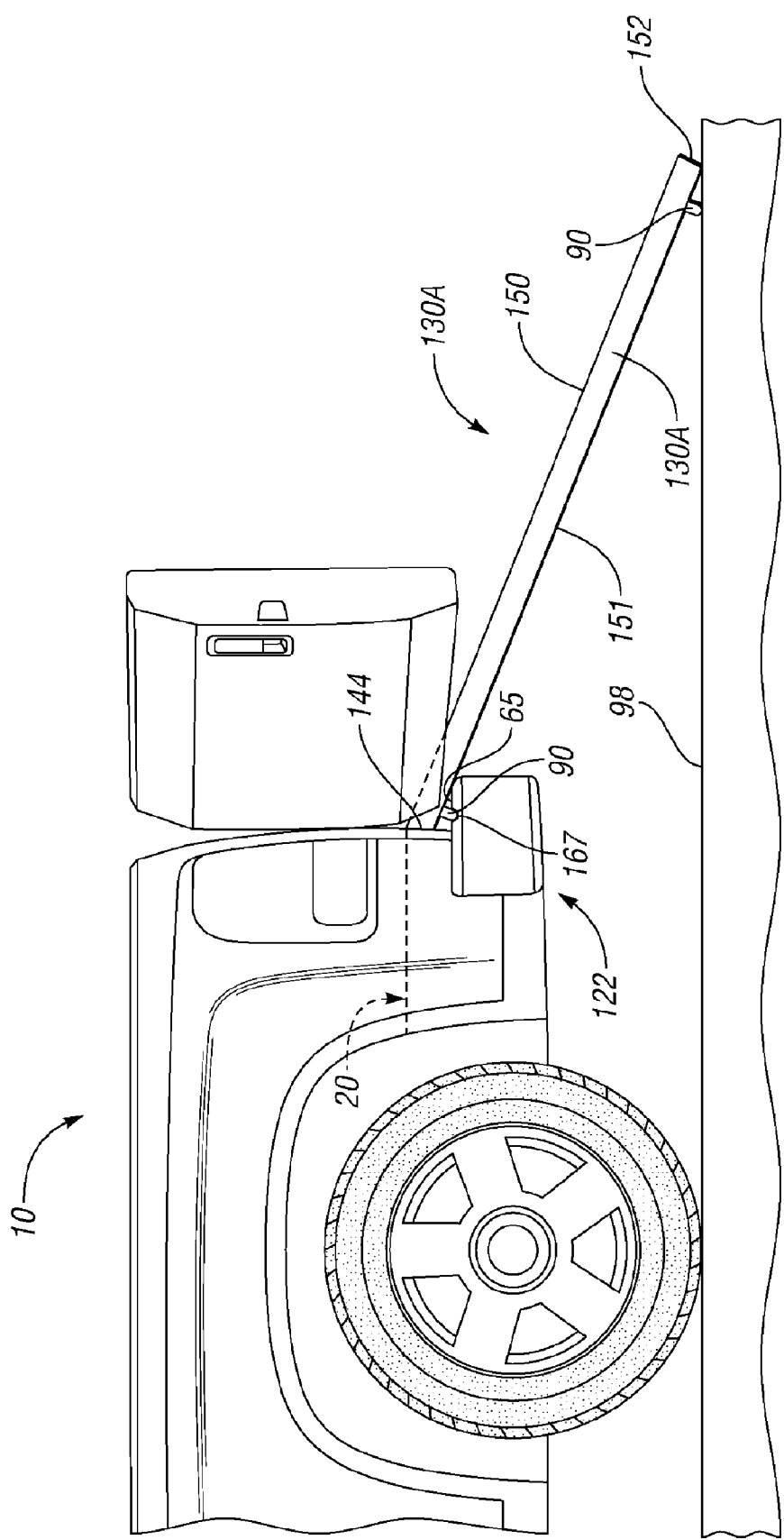
FIG. 7 is a schematic side view illustration of the detachable dual-use platform of FIGS. 6A, 6B, and 6C.

Turning to FIG. 7, a portion of vehicle 10 (also see FIGS. 1 and 2) is shown with platform 130A installed in its capacity as a loading ramp. As explained hereinabove, platform 130A is substantially identical to the previously described platform 130B (see FIGS. 6A, 6B, and 6C), with platform 130A being constructed and formed for attachment to the opposite or driver side of vehicle 10. In its loading ramp configuration, platform 130B is positioned with one distal end 152 set or placed on the ground 98, and the opposite distal end 152 placed adjacent to lip 44 (also see FIGS. 1 and 2).

Bumper 122 includes upper surface 65 (also see FIGS. 1 and 2), which may be formed with or attached to a slip-resistant material to form a suitable step surface for accessing cargo area 20. Upper surface 65 is formed with or otherwise includes a preferably circular groove 167 adapted or formed to receive and secure handle/locator bar 90 therein, i.e. to serve as an alternate ramp adapter apparatus to ramp adapter 20 (see FIGS. 4 and 5), after platform 130A is transported thereto. For example, groove 167 may be formed with a sufficient amount of elastic deformability to allow handle/locator bar 90 to snap or lock in place within groove 167. Once installed as a loading ramp, platform 130A is securely supported by bumper 122 and ground 98, and is restricted from moving in a forward or rearward direction by locator bar 90 which is captive within groove 167.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a vehicle body defining a cargo area and a passenger compartment;
   a detachable dual-use platform having a through-opening formed in one end, said through-opening forming a hand hold for carrying or transporting said detachable dual-use platform, wherein said detachable dual-use platform is alternately connectable adjacently to said cargo area to form a ramp for accessing said cargo area, and to the underside of the vehicle adjacently to said passenger compartment to form a running board for accessing said passenger compartment; and
   a ramp adapter operatively attached to or integrally formed with said vehicle at a position that is adjacent to said cargo area, wherein said ramp adapter includes a plurality of hooking mechanisms configured to engage said through-opening to thereby secure said detachable dual-use platform to the vehicle when said detachable dual-use platform is used as said ramp.

2. The vehicle of claim 1, the vehicle further comprising a plurality of mounting brackets positioned along an underside of the vehicle, wherein said detachable dual-use platform includes a plurality of mounting holes each adapted to engage a respective one of said plurality of mounting brackets when said detachable dual-use platform is used as said running board.

3. A platform apparatus for accessing a vehicle having a vehicle body defining a cargo area and a passenger compartment, the platform apparatus comprising:
   a plurality of hooking mechanisms positioned adjacently to the cargo area; and
   a detachable dual-use platform having a slip-resistant step surface on one side and defining a through-opening that forms a hand hold for carrying or transporting said detachable dual-use platform, wherein said through-opening is engageable with said plurality of hooking mechanisms, said detachable dual-use platform portion being configured for alternate use as a running board suitable for accessing the passenger compartment when attached adjacently to the passenger compartment, and as a ramp suitable for accessing the cargo area when attached to said first locator portion.

4. The platform apparatus of claim 3, wherein the vehicle includes a plurality of mounting brackets positioned along an underside of the vehicle, and wherein said detachable dual-use platform includes a plurality of mounting holes each adapted to engage a respective one of said plurality of mounting brackets when said detachable dual-use platform is used as said running board.

* * * * *